2,703,187

METHOD OF STABILIZING METAL CATALYSTS

Kenneth K. Kearby, Cranford, N. J., assignor to Esso Research and Engineering Company, a corporation of Delaware No Drawing. Application March 2, 1951,
Serial No. 213,669

6 Claims. (Cl. 252—442)

This invention relates to the preparation of catalysts for the reforming of hydrocarbons in the naphtha boiling range. More specifically, it relates to the preparation of a catalyst containing very small amounts or even trace amounts of a catalytic metal on a catalyst support.

The catalytic metals with which this invention is concerned are metals of group VIII of the periodic system which are known to have a pronounced effect on splitting the carbon-hydrogen and carbon-carbon bonds of hydrocarbon molecules at elevated temperatures. The properties of nickel, iron, cobalt, platinum, palladium and the like are well known in this connection. This invention is particularly concerned with the use of noble metal catalysts in this group, specifically platinum, palladium, rhodium, iridium and the like.

Catalysts containing platinum have been described in the literature and used to some extent commercially for the reforming of naphthas. A well known disadvantage of such catalysts in this use, however, is the fact that they tend to lose activity after a period in use, which is particularly short when the catalyst is subjected to periodic regeneration by oxidation to remove carbonaceous deposits formed during the hydrocarbon conversion. A careful inspection of platinum catalysts which have lost activity in this way, by X-ray and other crystallographic techniques, indicates that the platinum which was originally present in a highly dispersed amorphous form has a tendency to grow into metallic crystals having a larger size and much lower surface area corresponding to their greatly reduced catalytic activity.

One object of the present invention is to prepare a noble metal catalyst which will retain the metal in the amorphous highly active condition during prolonged periods of use.

Another object is to prepare such a catalyst so as to withstand conditions of repeated oxidative regeneration without marked loss in activity.

Another object of the present invention is to prepare a platinum or other noble metal catalyst of the platinum group in such a manner that growth of the original finely divided amorphous particles into larger sized metallic crystals is retarded or substantially avoided.

According to the present invention the crystal growth tendency of amorphous or colloidal platinum or palladium deposited on the surface of a catalyst support can be markedly reduced by adding a stabilizing oxide in the form of a protective colloid at the same time the colloidal platinum or palladium is deposited on the support. The exact function of this stabilizing oxide is not known, but crystallographic studies indicate that the particles of colloidal metal laid down in this way may be held in a framework of colloidal metal oxide which acts as a mechanical barrier inhibiting crystal growth. According to this theory, for the metal crystals to grow it is necessary for the original particles to be in contact with each other, and for them to reside in an environment which provides free space for crystal growth. The function of the stabilizing oxide provided according to the present invention may be either to prevent the platinum or other metal particles from coming into actual contact with each other or it may be partly to surround each metal particle with a gel structure which inhibits crystal growth by reducing the exposed surface area of each particle. Either or both of these functions may be involved and other mechanisms of deactivation not outlined here may explain this behavior in whole or in part.

The essence of the invention involves the deposition of the catalytic metal in colloidal dispersion simultaneously with the colloidal hydrated metal oxide which serves as the protective colloid. It is only by carrying out such a simultaneous precipitation of these two constituents that the stabilizing activity of the colloidal metal oxide to inhibit crystal growth on subsequent use can be fully realized. Various preparation methods, as described below, can be employed to accomplish this result. The nature of the colloidal oxide and of the catalyst support upon which the metal and protective colloid are disposed are closely related factors in determining the physical and chemical properties of the catalyst, as discussed in detail below. In certain cases I prefer to use a stabilizing protective colloid composed of the same metal oxide as that used in the form of a preformed gel, or in other suitable form, for the catalyst support. In other cases, I may use a different metal oxide as the protective colloid.

The amount of catalytic metal to be used is dictated by economic considerations, since the noble metals are very expensive and the cost of the catalyst varies almost in direct proportion to the amount of this constituent required. Experience has shown that very small amounts of these catalytic metals are adequate. Indeed a large amount of the catalytic metal may induce too high a degree of activity, resulting in excessive tendency for the catalyst to form gas and to deposit carbonaceous degradative products during the hydrocarbon conversion step. Accordingly I prefer to use very small or trace amounts of the metallic constituents of the order of 0.05 to 2% by weight based upon the catalyst support. The amount of protective colloid which I employ is related to the amount of metallic constituent required, and I prefer to use from about 0.5% to 20% by weight of the stabilizing oxide based on catalyst support in this way.

In this connection a particular advantage of the catalyst prepared according to one embodiment of the present invention is that it shows a greater lasting effect for a small amount of catalytic metal than catalysts of similar composition prepared by previously recommended procedures. Thus in accordance with the present improvements, the catalytic metal is incorporated into the surface of the gel structure supported on the catalyst carrier, without having to permeate the whole mass of the catalyst carrier itself. This eliminates certain disadvantages of previous methods of preparing platinum catalysts where the catalytic metal was either deposited as the free metal on the exterior surface of the catalyst carrier, or impregnated on the carrier in such a way as to permeate the entire mass. The first of these previous methods of preparation is particularly susceptible to a deterioration in catalyst activity by virtue of the transformation of amorphous metal particles into metal crystals, and there is also a somewhat greater tendency for the catalyst particles to become dissociated from the surface of the carrier by attrition or erosion. The second method in which the metal permeates the support tends to correct these difficulties, but at the expense of requiring a very much greater quantity of the catalytic metal, so as to establish an unnecessarily high concentration of the metal within the whole interior of the catalyst particle, as well as upon the surface. It is well known that the activity of catalysts of this nature is a surface phenomenon, and those portions of the catalyst structure which are closest to the surface play a much more significant role in the catalytic behavior than the interior portions which are only available by virtue of the diffusion of gases through the exposed surface.

The nature of the colloidal dispersion of the catalytic metal deposited together with the protective colloid may also be varied, depending upon the particular colloidal materials being used for this purpose. The original deposit of catalytic metal may be in partly reduced form, as a mixed deposit of the colloidal metal and a colloidal metallic compound, or it may be wholly in the form of colloidal metal particles, or wholly in the form of a colloidal compound which is subsequently reduced to colloidal metal particles as described below. The choice on this matter depends upon the chemical properties on the stabilizing metal oxide. The essential variable to to choose a precipitant and precipitating conditions which will bring the catalytic metal and the stabilizing oxide down in the form of a simultaneously precipitated colloidal dispersion. In many cases it may be preferred to initiate the precipitation of either the catalytic metal or the stabilizing oxide alone, whichever is brought down more slowly with the precipitant, in the absence of the other constituent, which is then added after the precipitation has been initiated so that the final deposition will occur at about the same time.

In addition to the catalytic metal the catalyst support and the stabilizing oxide both contribute important effects in determining the activity of the catalyst. For this reason, proper choice of the chemical and physical composition of these compounds is an important element in the preparation of my improved reforming catalyst. The catalyst support is a porous, adsorptive material, capable of giving a stable structure and large free surface to the finished catalyst. In cases where the catalyst is to be used in the form of granules or pills, the desired structure is one which will give a certain minimum crushing strength and resistance to shrinkage as a necessary property of the finished material. In other cases where the catalyst is to be used in the form of more finely divided particles and handled by the fluidized solids technique, a necessary property is a certain abrasion resistance, to minimize any tendency to dusting or changes in surface composition. In either case, regardless of the method in which the catalyst is to be used, it is highly desirable to have a preparation which will retain its chemical properties essentially unchanged during long periods of use. In this respect it is important that the catalyst retain not only its activity but also its selectivity or the type of chemical reaction which it promotes.

For hydroforming processes according to my invention when using hydrogen regeneration only, activated carbon or various adsorptive metal oxides may be employed as the base or carrier. Where oxidative regeneration is required, carbon is not a suitable base and any of various metal oxide bases may be preferred.

The composition and amount of the protective colloid employed as a stabilizing oxide in the preparation of my catalyst are likewise related to the nature of both the catalytic metal and the catalyst support employed. The amount of the stabilizing oxide is preferably somewhat greater than the molecular equivalent of the amount of catalytic metal, since the protective colloid is to function essentially as a network or framework surrounding each particle of catalytic metal in the finished catalyst. The exact proportions employed for this purpose will depend to a considerable extent upon the relative fineness or degree of subdivision of the particles of the catalytic metal and protective colloid catalyst preparation, but I have found it convenient to use from 2 to 20 times the molecular equivalent of stabilizing oxide based upon the amount of catalytic metal.

In addition to its physical or mechanical effect upon the amorphous or colloidal particles of catalytic metal, the stabilizing oxide in my catalyst cooperates chemically and physically with the catalyst support and the catalytic metal to determine the properties of my finished catalyst. More specifically, a catalyst on a silica base may be treated with a metal silicate or alkyl silicate and a coagulating agent to deposit hydrated silica along with the catalytic metal. An alumina base catalyst might be prepared similarly with a hydrated silica as the protective colloid. On the other hand, an alumina base might be used in connection with alumina as a protective colloid deposited from an alumina hydrosol or by the hydrolysis of an aluminum salt or an aluminum alcoholate or some other method. Alumina might likewise be used as a protective colloid on an alumina base or on a commercial active alumina containing a certain amount of silica or titania as a minor component. Still another metal oxide may be used as a protective colloid, particularly the hydrated oxides of chromium, zirconium, thorium, titanium or iron on an alumina or silica base. Any of these oxides or combinations between them can be used as a protective colloid with other types of catalyst carriers such, for example, as activated carbon.

Specific methods of preparing catalysts according to my invention will now be described. In general, a support such as $Al_2O_3$, $SiO_2$, activated carbon, $SiO_2$—$Al_2O_3$, or the equivalent is impregnated with soluble compounds of the noble metal and the stabilizing oxide and then treated with a precipitant or precipitants capable of precipitating both components in colloidal form at about the same time. Alternatively the support may be impregnated with a sol containing the two components in colloidal suspension. In many cases, it is preferable to use colloidal alumina on an alumina support and colloidal silica on a silica support. Colloidal $ZrO_2$ or $Cr_2O_3$ can be used on any of the above supports.

Numerous methods of preparing $SiO_2$, $Al_2O_3$, $ZrO_2$, or $Cr_2O_3$ in the form of colloidal hydroxides have been described. Some of these methods can be utilized in the presence of soluble salts of platinum with gelling agents that simultaneously coagulate the platinum.

Alcoholates of silicon and aluminum may be hydrolyzed to form colloidal gels of the corresponding hydroxides while simultaneously precipitating platinum on the same carrier. A convenient means of adding colloidal hydroxides of Al, Zr or Cr and platinum to a support involves the use of ethylene oxide as a precipitant. The support may be impregnated with chloride solutions of one or more of these elements and of platinum and then treated in the wet state with gaseous ethylene oxide. Alternatively the support may be impregnated with a mixed solution of the chlorides and of ethylene oxide. In preparing such a solution the stabilizing component chloride may be allowed to react with the ethylene oxide before adding the platinum chloride in order to obtain the desired simultaneous precipitation.

Platinic chloride may also be introduced into an acid peptized or salt peptized sol of the stabilizing hydroxide and then treated with a suitable weakly basic reacting material. Sols may be prepared by known procedures such as dialysis followed by peptization, hydrolysis of alcoholates, etc. Chromia gels may be prepared in situ with platinum by simultaneous reduction of a solution of chromic acid and platinic chloride with a reducing agent such as alcohol, sugar, etc. Ammonium acetate precipitation of a mixed solution of chromic nitrate and platinic chloride may also be used. All of these methods possess a distinct advantage over conventional methods of precipitating with $H_2S$ or $NH_4OH$, since it is difficult to avoid selective precipitation of one component with these reagents.

The above described methods may be used on either a fluoride treated or an untreated base, or the catalyst may be treated with a fluoriding compound after the noble metal and stabilizing additive have been added. A specific description of several catalysts prepared according to my invention is given below:

Example I

Composition: 97.5 gamma $Al_2O_3$—0.5 Pt—2.0 $Al_2O_3$ (gel)

An alumina gel, or an alumina gel containing 1–5% $SiO_2$ as a stabilizer (H–41 alumina) is calcined for 3 hours at 1250° F. and cooled. A quanity of this support equivalent to 975 grams of $Al_2O_3$ is soaked in a solution of aluminum chloride and platinic chloride of such concentrations that after it is thoroughly drained the wet support will contain platinum and added alumina in the proportions indicated above. The exact concentration to be used varies with the particular alumina used and must be determined experimentally. Following the draining, the wet granules are treated in situ with gaseous ethylene oxide using about a 20% excess. After standing 24–48 hours, the granules are dried at 250° F. and gradually calcined at increasing temperatures up to 900° F. Before use the catalyst is reduced with hydrogen. If less cracking activity is desired in the catalyst, it should be washed before it is dried and the silica should be omitted.

Example II

94 $Al_2O_3$—0.5 Pt—5.0 $Al_2O_3$ 206 g. of $AlCl_3.6$ $H_2O$ are dissolved in water and diluted to a volume of 500 cc. This solution is cooled to 10° C. and 200 cc. of liquid ethylene oxide added. After standing for two hours a solution of 7.5 g. $PtCl_4$ in 100 cc. $H_2O$ is stirred in. The resulting solution is used to impregnate 820 g. of alumina which has previously been calcined six hours at 1300° F. After standing 24 hours the catalyst is dried at room temperature and then at 220° F. The temperature is then slowly increased to 1000° F. and the catalyst calcined 3 hours at this temperature.

Example II–B

94 $Al_2O_3$—0.5 Pt—2.5 $Al_2O_3$

This catalyst is prepared the same as that in Example II except that half as much aluminum chloride is used and this solution is reacted with an equivalent amount of MgO to form a sol instead of using ethylene oxide.

Example III

This catalyst is prepared in a manner similar to that used for the catalyst in Example II except that the alumina is impregnated with a mixed solution of aluminum amylate and platinic chloride in alcohol. The wet granules are then treated with moist air which initially contains sufficient ethylene oxide vapor to be equivalent to the platinic chloride.

Example IV

This catalyst is prepared similar to that in Example III except that a sol is prepared by adding a small amount of dilute acetic acid (which also contains the ethylene oxide) to the aluminum amylate-platinic chloride solution before impregnating the active alumina.

Example V

94 $Al_2O_3$—0.5 Pt—5 $Cr_2O_3$

This catalyst is prepared the same as that in Example II except that 194 g. of $CrCl_3.10$ $H_2O$ are used in place of the 206 g. of $AlCl_3.6$ $H_2O$.

Example VI

94 $Al_2O_3$—0.5 Pt—5 $Cr_2O_3$ 230 grams of $Cr(NO_3)_3.9$ $H_2O$ are dissolved in 400 cc. of water and a solution of 7.5 g. of $PtCl_4$ in 100 cc. of water added. This solution is used to impregnate 820 g. of active alumina. The alumina is dried and then impregnated with a solution of 200 g. of ammonium acetate in 500 cc. of water. The catalyst is washed, dried, and calcined 3 hours at 1000° F.

Example VII

94 $Al_2O_3$—0.5 Pt—5 $ZrO_2$

This catalyst is prepared the same as that in Example II except that 82.3 g. of $ZrCl_4$ are used in place of the 206 g. of $AlCl_3.6$ $H_2O$.

Example VIII

100 $Al_2O_3$ + 0.5 Pt + 5 $SiO_2$ 73.6 cc. of ethyl ortho silicate are mixed with 76 cc. of isopropyl alcohol and stirred into a solution of 10 cc. of concentrated hydrochloric acid in 40 cc. of water. This solution is allowed to stand until a noticeable increase in its viscosity has taken place. A solution of 3.6 g. of platinic chloride ($PtCl_4$) in 20 cc. of water is stirred in and 20 cc. of liquid ethylene oxide added. This solution is then used to impregnate 400 g. of a calcined (1300° F.) active alumina gel which has a surface area of about 250 square meters per gram. After standing at room temperature for about 24 hours the granules are dried slowly at 220° F. and then calcined for 3 hours at 1200° F.

Example IX

100 $SiO_2$—0.5 Pt—5 $SiO_2$

Same as Example VIII except that 400 grams of silica gel (which had been activated at 600° F.) are used in place of the 400 grams of alumina.

It will be understood that the above examples merely illustrate methods of obtaining added oxides and platinum mutually dispersed and coagulated in colloidal form. As previously indicated there are a wide variety of methods of obtaining sols and gels of the stabilizing oxides and it is within the scope of this invention to use any of these methods which are compatible with the controlled precipitation of platinum or a platinum compound in colloidal form from one of its soluble compounds.

The reforming process for which these catalysts are particularly suited is the process known as hydroforming, which converts a naphtha feed stock into a naphtha product of improved anti-knock properties. This is an operation carried out in the presence of a solid catalyst and in an atmosphere containing free hydrogen but without a net consumption of hydrogen. In hydroforming operations, hydrogen is evolved by the transformation of other hydrocarbons including naphthenes into aromatics. A certain amount of hydrogenation may take place if the feed stock to the hydroforming step contains olefinic material, and a small amount of hydrocracking may be involved with the formation of lower molecular weight saturated hydrocarbons. The amount of hydrocracking in particular may be promoted or minimized as desired by suitable changes in the operating conditions of temperature and pressure or in the composition of the catalyst, as discussed above.

The naphtha feed stock to be treated by this reforming process can be derived from a wide variety of sources. It is most commonly a hydrocarbon stream derived at least in part directly from petroleum, in the form of straight run or virgin naphtha. It may also contain secondary naphtha products derived from petroleum, such as naphthas produced by thermal cracking or catalytic cracking processes. It may also contain any of a variety of synthetic naphthas which may be produced from hydrocarbon or carbonaceous raw materials by a variety of processes including direct gasification, the catalytic reduction of carbon monoxide and other thermal or catalytic reactions. The term naphtha will be understood to include both light naphthas and heavy naphthas from any of these sources, including various hydrocarbons and a certain amount of hydrocarbon derivatives, within the boiling range from approxmately 0–450° F.

The platinum-containing catalysts of the present invention are particularly useful for hydroforming operations carried out under conditions where the catalyst becomes rapidly fouled with a carbonaceous deposit caused by the degradation of some of the constituents of the feed stock into coke. An example of such an operation is the so-called "low pressure hydroforming," at a pressure in the range of about 100–300 lbs. per sq. in. as contrasted to high pressure operation in the range of 750 lbs. per sq. in. where very little or no such coke deposits are formed. The improved octane number of the product obtained under low pressure operating conditions compensates for the disadvantage which this coke production entails when using a catalyst prepared according to the present invention to withstand repeated cycles on stream and in regeneration without loss in activity and in selectivity for the desired reactions. The regeneration treatment involved to remove the carbonaceous deposit or coke laid down in the hydroforming process under these conditions may be hydrogen treatment at reaction temperature or higher temperature in the absence of the feed stock. In other cases where hydrogen treatment alone is not sufficient to keep the catalyst satisfactorily free of coke, a more intensive regeneration procedure may be employed to burn the coke deposit in a stream of air or other oxygen containing gas. Any such oxidative regeneration process, however, converts the catalytic material of a metallic catalyst at least partly to the metal oxide, and the regenerated catalyst oxidized in this way must be reduced again to the metallic form before proceeding with the hydroforming process. This alternating cycle of oxidation and reduction of the metallic constituents is especially harmful in converting the amorphous highly active catalytic metal particles into the crystalline relatively inactive form. The superior properties of the stabilized catalysts prepared according to the present invention are particularly evident by contrast with the rapid loss in activity which conventional platinum catalysts undergo under relatively severe operating conditions of this type.

The term "colloidal" or "colloidal dispersion" as used in the present application, defines an amorphous state of matter as distinguished from the crystalline state. It may refer either to finely divided particles in the case of the catalytic metal or the rudiment metal-containing deposit from which the catalytic metal is to be obtained by reduction, or a network of partly hydrated metal oxide macromolecules in the case of the stabilizing oxide or the catalyst carrier. The term "colloidal" as used in this way defines partly the size of the particles or macromolecules concerned, in general about 100 to 1,000 angstrom units or finer in size. It also defines the amorphous nature, as distinguished from the crystalline form which can exist for many of these materials and particles of the same size range, as well as for larger particles. This amorphous nature of the colloidal dispersions has an important bearing on surface characteristics, including hydration and adsorptive capacities. Thus it has a major determining influence on catalytic properties, and a large number of the porous adsorptive materials used as catalysts are colloidal in nature.

What is claimed is:

1. The method of preparing a catalyst for naphtha reforming which comprises simultaneously depositing upon a catalytic supporting material prepared from a dried active alumina from 0.05% to 2% of colloidal alumina as a protective colloid and from 0.05 to 2% of metallic platinum colloidally dispersed therein, subsequently treating this composition with hydrogen fluoride to give a catalyst containing from 0.1 to 2% of fluoride by weight based on dried alumina, then drying, calcining and reducing with hydrogen before use.

2. The method of preparing a catalyst for the reforming of hydrocarbons in the naphtha boiling range which comprises depositing together upon an active alumina catalyst support from 0.05 to 2% by weight of amorphous particles of a catalytic noble metal taken from the group consisting of platinum, palladium, rhodium and iridium, colloidally dispersed in from 0.5 to 20% by weight of a protective colloid having the form of a simultaneously precipitated hydrous oxide gel and thereafter drying, calcining and reducing said catalyst.

3. The method of preparing a platinum-containing catalyst for the reforming of hydrocarbons which comprises dispersing a platinum solution in an alumina hydrosol, simultaneously coagulating both components in the form of a plural gel, depositing said gel upon a preformed alumina base and thereafter drying, calcining and reducing the platinum-containing component thereof to metallic platinum to recover a reforming catalyst.

4. The method of making a catalyst for the reforming of hydrocarbons in the naphtha boiling range which comprises treating a granular dried and calcined active alumina with a solution of an aluminum salt and a platinum salt of such concentration that after it is thoroughly drained, the wet support will contain platinum in the range of from 0.05 to 2% by weight and added alumina in the range of from 0.5 to 20% by weight, then treating the wet composite to simultaneously precipitate colloidal platinum and colloidal alumina from said solution upon the surface of the wet support, after which the granules are dried, calcined and reduced with hydrogen before use.

5. The method of making a catalyst for the reforming of hydrocarbons in the naphtha boiling range which comprises treating a dried and calcined active alumina with a solution of an aluminum salt and a platinum salt in a limited amount of water of such concentration that after any unimbibed solution has been drained the wet support will contain about 0.5% by weight of platinum and about 2% by weight of added alumina based upon the weight of said dried alumina base, treating the wet support with gaseous ethylene oxide and thereby coagulating simultaneously thereon from said solution a platinum-containing deposit and a hydrous alumina, drying said treated material at about 250° F., calcining at gradually increased temperatures up to 900° F. and reducing the treated mass with hydrogen to recover said catalyst for the reforming process.

6. The method of claim 5 in which the active alumina used as the catalyst support contains from 1 to 5% of $SiO_2$ as a stabilizer.

References Cited in the file of this patent

UNITED STATES PATENTS

| | | |
|---|---|---|
| 2,478,916 | Haensel et al. | Aug. 16, 1949 |
| 2,589,189 | Ciapetta et al. | Mar. 11, 1952 |